United States Patent [19]
Griffin

[11] 3,851,837
[45] Dec. 3, 1974

[54] VEHICLE OCCUPANT RESTRAINT BELT RETRACTOR

[75] Inventor: Henry W. Griffin, Birmingham, Mich.

[73] Assignee: General Motors Corporation, Detroit, Mich.

[22] Filed: Sept. 4, 1973

[21] Appl. No.: 394,060

[52] U.S. Cl.............. 242/107.4, 188/180, 188/186
[51] Int. Cl............................................ A62b 35/00
[58] Field of Search.................. 242/107.4, 107 SB; 188/82.77, 139, 135, 180, 186; 244/122 B; 280/150 SB

[56] References Cited
UNITED STATES PATENTS

| | | | |
|---|---|---|---|
| 2,659,800 | 5/1972 | Meyer | 242/107.4 |
| 3,489,367 | 1/1970 | Kovacs et al. | 242/107.4 |
| 3,632,057 | 4/1972 | Pringle | 242/107.4 |

Primary Examiner—Billy S. Taylor
Attorney, Agent, or Firm—J. A. Kushman

[57] ABSTRACT

A vehicle occupant restraint belt retractor whose belt unwinding locking is actuated in response to abrupt deceleration of the forward vehicle movement by way of mercury carried within a receptacle that is mounted on a movable locking member of the retractor. The receptacle has a pistol-shaped configuration that points in a forward direction so as to define a lower sump portion normally receiving the mercury and thereby positioning the locking member in an unlocked position with respect to the retractor belt reel, and a forward nose portion to which the mercury moves during the frontal vehicle deceleration so as to thereby pivot the locking member into a locked position engaging the retractor belt reel in a manner terminating belt unwinding reel rotation. The reel is spring biased away from a fixed locking portion of the retractor housing and is shifted bodily against this bias by belt tension when the movable locking member terminates reel rotation. This bodily shifting reel movement engages the reel with the fixed locking portion of the housing so that the movable locking member and the fixed locking portion cooperatively hold the belt reel against belt unwinding rotation. The nose portion of the receptacle drains the mercury back into the sump portion when the vehicle deceleration subsides so that the locking member is moved back to unlocked position after the belt tension is released and the reel is shifted bodily out of engagement with the fixed locking portion of the housing.

4 Claims, 3 Drawing Figures

PATENTED DEC 3 1974

3,851,837

VEHICLE OCCUPANT RESTRAINT BELT RETRACTOR

BACKGROUND OF THE INVENTION

This invention relates generally to a vehicle occupant restraint belt retractor whose locking is of the inertia type so as to prevent unwinding rotation of the retractor belt reel during abrupt changes in the rate of vehicle movement.

It has been known in the past to provide vehicle occupant restraint belt retractors whose locking is actuated in response to abrupt changes in the rate of vehicle movement so as to thereby prevent belt unwinding rotation of the retractor belt reel during such conditions. This locking thus restrains an occupant who is encircled by the belt of the retractor so as to prevent occupant movement while the retractor is locked. At all other times, the occupant is free to move about the vehicle by merely overcoming the normal winding bias of the retractor belt reel which, upon detachment of the belt from its use position, winds the belt in a stored condition on the reel to provide the vehicle with an uncluttered and aesthetically appealing appearance. In the past, vehicle sensitive inertia retractors of this type have included an inertia member such as a pendulum or a ball that moves in response to the abrupt change in the rate of vehicle movement to actuate a suitable locking mechanism or member that locks the retractor belt reel against belt unwinding rotation.

It has also been known to provide vehicle inertia switches in which a receptacle receives liquid mercury whose movement in response to abrupt changes in the rate of vehicle movement closes electrical contacts that provide a closed path for an electrical circuit during such conditions. This circuit may include a suitable indicator or device that is desired to be actuated when the vehicle movement is changing in this abrupt fashion.

SUMMARY OF THE INVENTION

The vehicle occupant restraint belt retractor of this invention is locked against belt unwinding in response to abrupt deceleration of the forward vehicle movement by way of mercury carried within a receptacle that is mounted on a movable locking member of the retractor.

One feature of the invention is that the mercury moves forwardly within the receptacle during abrupt deceleration of the forward rate of vehicle movement and moves the locking member into a locked position engaging the retractor belt reel so as to thereby prevent belt unwinding reel rotation during such vehicle deceleration. Another feature of the invention is that the locking member is pivotally mounted on the retractor housing for movement about a generally transverse vehicle axis and the mercury moves forward of this axis of locking member movement so as to pivot the locking member to the locked position in response to the abrupt vehicle deceleration. Another feature of the invention is that the receptacle that carries the mercury on the locking member has a rearward sump portion that normally receives the mercury so as to position the locking member in the unlocked position and has an upper and forward nose portion to which the mercury moves to pivot the locking member to locked position, and the nose portion drains the mercury back to the sump portion of the receptacle after the vehicle deceleration subsides so as to move the locking member back to unlocked position. Another feature of the invention is that the locking member has an elongated configuration and carries one of the mercury receptacles on each end thereof, and the belt reel is bodily movable against a spring bias upon locking engagement with the locking member so as to move into engagement with a fixed locking portion of the retractor housing that cooperates with the locking member in holding the belt reel against belt unwinding reel rotation.

BRIEF DESCRIPTION OF THE DRAWINGS

The above-specified features and other features, objects and advantages of the present invention are readily apparent from the following detailed description of the preferred embodiment and the drawings in which.

BRIEF DESCRIPTION OF THE PREFERRED EMBODIMENT

Figure 1:
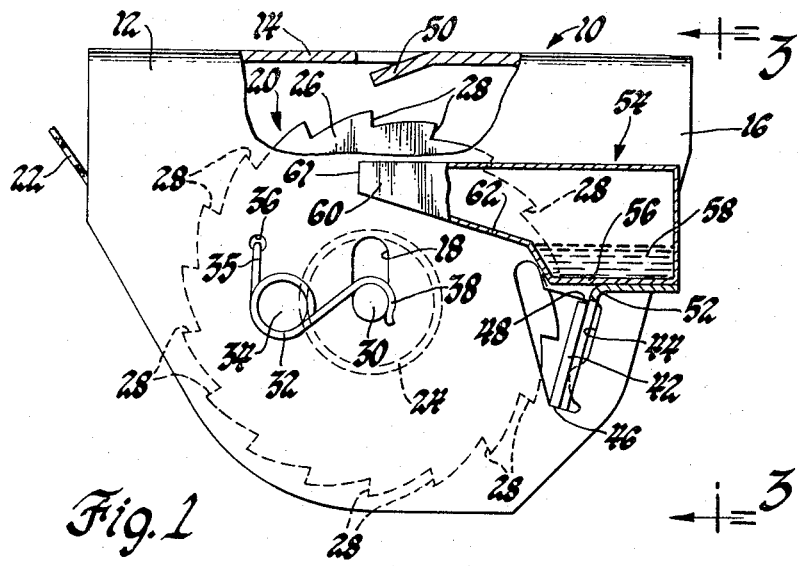
FIG. 1 is a partially broken away side elevation view of a vehicle occupant restraint belt retractor, according to this invention, which is shown in an unlocked condition where belt unwinding rotation of the retractor belt reel is possible.
Figure 2:
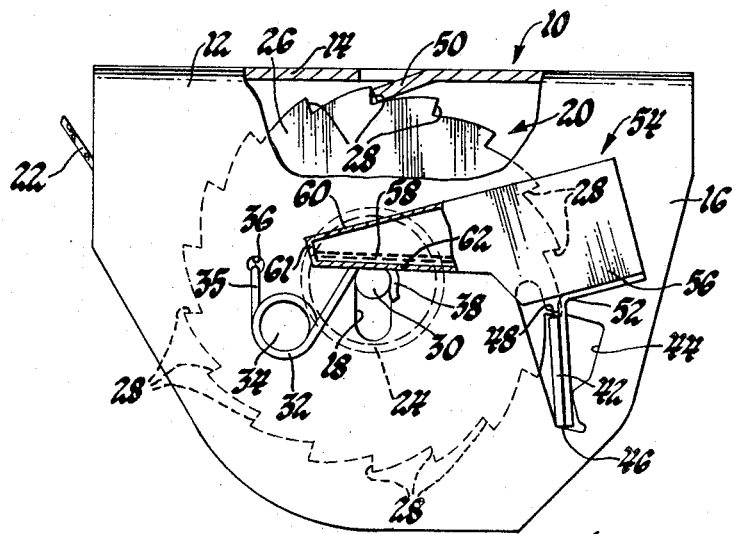
FIG. 2 is a view similar to FIG. 1 but with the retractor shown in a locked condition where the belt reel is held against belt unwinding rotation so as to thereby restrain a vehicle occupant who is encircled by the belt wound on the belt reel.

Referring to the drawings, a vehicle occupant restraint belt retractor according to this invention is generally indicated by 10 and includes a metallic housing 12. An upper base 14 of the retractor housing has a generally planar configuration and is adaptable to mount the housing on a horizontal vehicle surface such as by way of attachment bolts received by unshown apertures provided in the base. A pair of side walls 16 of the retractor housing are integral with the base 14 and extend downwardly therefrom in a spaced and parallel relationship with respect to each other. Each of the side walls 16 define a vertical slot 18 with rounded upper and lower ends as can be seen in FIGS. 1 and 2.

Figure 3:
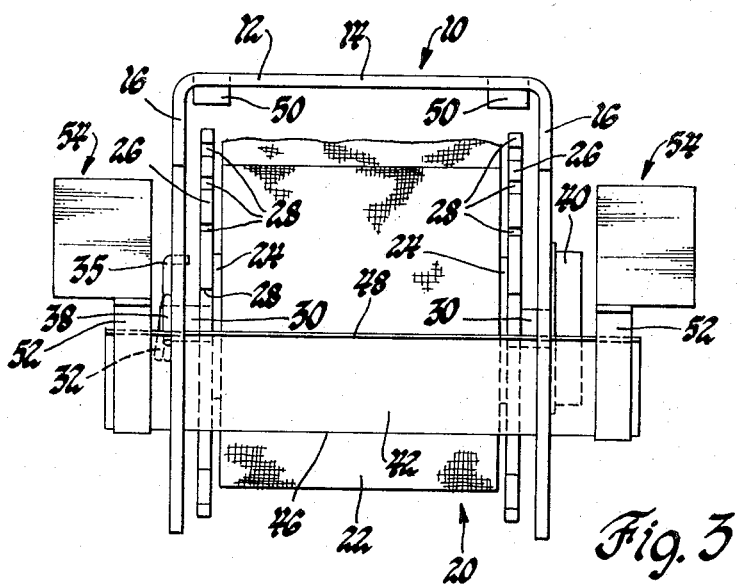
FIG. 3 is an end view of the retractor taken generally along line 3—3 of FIG. 1.

A belt reel indicated generally by 20 is located between the side walls 16 of the retractor housing and is rotatable so as to wind and unwind an occupant restraint belt 22. A drum 24 of the belt reel attaches the inner end of belt 22 and receives the belt in its wound condition. Each of the ends of the drum is suitably fixed to an associated end plate 26 of the reel. These end plates define circumferentially spaced locking surfaces indicated generally by 28 and facing in the clockwise direction of belt unwinding reel rotation as shown in FIGS. 1 and 2. A central shaft 30 of the reel extends between and is suitably affixed to the reel ends plates 26. The ends of shaft 30 are received by the vertical slots 18 in the retractor housing side walls 16 so as to thereby rotatably support the reel. On the outer side of each sidewall 16, a torsion spring 32, only one seen in the drawings, encircles a short pin 34 fixedly mounted on the sidewall. Inwardly turned ends 35 of these springs are received within wall apertures 36 so as to fix these springs against rotation, and their opposite ends have hooked configurations 38 that engage the respective ends of reel shaft 30. The springs 32 bias the belt reel downwardly to the position shown in FIG. 1 where the ends of reel shaft 30 engage the lower ends of sidewall slots 18. The right-hand end of the shaft as shown in FIG. 3 is received within a plastic cover 40 mounted on the outer side of the adjacent housing sidewall. Within this cover, the shaft end attaches the inner end of a clock type spring, not shown, whose outer end is suitably secured to the housing side wall so as to bias the reel in a belt winding direction, counterclockwise as viewed in FIGS. 1 and 2. The cover 40 must define a suitable opening to allow the one torsion spring 32 not shown by the drawings to engage the shaft 30 and still be located on the outer side of the housing sidewall in the position of the torsion spring that is shown.

A locking member 42 of the reactor has a generally elongated rectangular configuration as can be seen in FIG. 3. The ends of the locking member, as seen in FIGS. 1 and 2, are received by apertures 44 in the housing sidewalls 16. These apertures have somewhat wedge-shaped configurations so that the locking member is movable about its lower edge 46 between the FIG. 1 unlocked position and the FIG. 2 locked position. This lower edge extends generally transversely of the vehicle when the retractor is mounted on the vehicle so that the pivotal locking member movement is thus about a transverse vehicle axis. In the locked position, the upper edge 48 of the locking member engages an aligned pair of the locking surfaces 28 on the reel end plates 26 and upward belt tension thereafter moves the belt reel 20 upwardly against the bias of torsion spring 32 so that a second cooperable set of the locking surfaces 28 engage fixed locking portions 50 of the housing base 14. These locking portions are stamped from the base to the configuration shown and are in spaced relationship to each other as seen in FIG. 3.

The ends of the locking member 42 extend out past the housing side walls 16 and support associated brackets 52 that have inverted generally L-shaped configurations. The upper legs of each bracket supports a mercury receptacle 54 which is secured thereto in a suitable manner. These receptacles have generally pistol-shaped configurations so that each defines a lower and rearward sump portion 56 that normally receives a quantity of mercury 58, as seen in FIG. 1, and an upper and forward nose portion 60. With the mercury received by the sump portions of the receptacles, the combined center of gravity of the movable locking member 42 and the mercury receptacles 54 is located rearward of the lower edge 46 of the locking member. Thus, gravity normally biases the locking member 42 to the FIG. 1 unlocked position so that a belted vehicle occupant is usually able to move about the vehicle by merely overcoming the winding bias of belt reel 20.

Abrupt deceleration of the rate of forward vehicle movement causes the mercury 58 to move forwardly and upwardly from the sump portion 56 of each receptacle into the nose portion 60 as shown in FIG. 2. The mercury thus moves forward of the lower edge 46 of locking member 42 upon such vehicle deceleration, and this movement causes the combined center of gravity of the locking member 42 and the mercury receptacles 54 to move forward of the lower edge of the locking member. Thus, gravity and the impact of the mercury with the forward walls 61 of the receptacle nose portions 60 cooperate to apply a counterclockwise torque to the locking member about its lower edge.

This torque tips the locking member 42 to the FIG. 2 locked position where the locking surfaces 28 on the belt reel end plates 26 engage the locking member in the manner previously described. This engagement terminates any clockwise belt unwinding reel rotation caused by forward movement of a belted vehicle occupant during such deceleration, and upward belt tension then causes the belt reel 20 to bodily shift upwardly and engage the fixed locking portions 50 of the housing base 14 in the manner previously described. The locking member 42 and the fixed locking portions 50 of the retractor housing then cooperate to lock the belt reel so that the belted occupant is restrained against appreciable forward movement during the frontal vehicle deceleration.

Lower wall segments 62 of the front receptacle nose portions 60 are inclined downwardly to the rearward in the FIG. 2 locked position so that the mercury 58 moves back to the receptacle sump portions 56 after cessation of the frontal vehicle deceleration. Consequently, the mercury then moves the combined center of gravity of the locking member 42 and the mercury receptacles 54 rearward of the lower edge 46 of the locking member. This movement provides a bias that returns the locking member 42 to the FIG. 1 unlocked position after a release of the upward belt tension allows the torsion springs 32 to shift the belt reel downwardly out of engagement with the fixed locking portions 50.

The retractor may also be designed so that downward belt tension bodily shifts the belt reel into engagement with fixed locking portions of the retractor housing. This will allow the retractor to be used with a shoulder belt that extends downwardly from the vehicle roof. With the upward belt tension causing the belt reel shifting, the retractor is best used as a lap belt retractor for a lap belt that extends upwardly from the floor of the vehicle. Also, the movable locking member does not necessarily require a mercury receptacle at each of its ends. However, having two of these receptacles as opposed to one does apply a force to each end of the locking member during movement thereof between the locked and unlocked positions. Thus, neither end moves solely in response to movement of the other end of the locking member, but rather each moves under its own impetus.

It is believed evident from the foregoing description that this invention provides a new and improved vehicle occupant restraint belt retractor.

What is claimed is:

1. A vehicle occupant restraint belt retractor comprising:

a housing adapted to be mounted on a vehicle;

a belt reel rotatably supported by the housing and movable in belt winding and unwinding directions of rotation, the belt reel including a drum for receiving an associated restraint belt and a pair of end plates at the ends of the drum, and the end plates defining circumferentially spaced locking surfaces facing in the belt unwinding direction of rotation;

a locking member mounted on the housing for movement between an unlocked position out of engagement with the belt reel and a locked position in engagement with a selected pair of locking surfaces on the end plates so as to prevent belt unwinding rotation of the reel; and a receptacle carried by the locking member and having mercury received therein, the receptacle including a lower rearward portion normally receiving the mercury so as to position the locking member in the unlocked position and an upper forward portion to which the mercury moves in response to a predetermined deceleration in the rate of forward vehicle movement so as to thereby move the locking member to locked position and thus prevent belt unwinding rotation of the reel in a manner that restrains a belted vehicle occupant during such deceleration.

2. A vehicle occupant restraint belt retractor comprising:
   a housing adapted to be mounted on a vehicle;
   a belt reel rotatably supported by the housing and movable in belt winding and unwinding directions of rotation, the belt reel including a drum for receiving an associated restraint belt and a pair of end plates at the ends of the drum, and the end plates defining circumferentially spaced locking surfaces facing in the belt unwinding direction of rotation;
   spring means normally biasing the belt reel in the belt winding direction of rotation so as to store the belt on the reel in a wound condition;
   a locking member mounted on the housing for pivotal movement about a generally transverse vehicle axis between an unlocked position out of engagement with the belt reel and a locked position in engagement with a selected pair of locking surfaces on the end plates so as to prevent belt unwinding rotation of the reel; and
   a receptacle carried by the locking member and having mercury received therein, the receptacle including a lower rearward portion normally receiving the mercury so as to position the locking member in the unlocked position and an upper forward portion to which the mercury moves in response to a predetermined deceleration in the rate of forward vehicle movement so that the mercury moves from the rearward side of the axis of locking member movement to the forward side thereof in a manner that pivots the locking member to locked position and thereby prevents belt unwinding reel rotation during such deceleration.

3. A vehicle occupant restraint belt retractor comprising:
   a housing adapted to be mounted on a vehicle;
   a belt reel rotatably supported by the housing and movable in belt winding and unwinding directions of rotation, the belt reel including a drum for receiving an associated restraint belt and a pair of end plates at the ends of the drum, and the end plates defining circumferentially spaced locking surfaces facing in the belt unwinding direction of rotation;
   spring means normally biasing the belt reel in the belt winding direction of rotation so as to store the belt on the reel in a wound condition;
   a locking member mounted on the housing for pivotal movement about a generally transverse vehicle axis between an unlocked position out of engagement with the belt reel and a locked position in engagement with a selected pair of locking surfaces on the end plates so as to prevent belt unwinding rotation of the reel; and
   a receptacle carried by the locking member and having mercury received therein, the receptacle having a rearward sump portion normally receiving the mercury so as to position the locking member in the unlocked position and having an upper and forward nose portion to which the mercury moves in response to a predetermined deceleration in the rate of forward vehicle movement so that the mercury moves from the rearward side of the axis of locking member movement to the forward side thereof and pivots the locking member to locked position so as to thereby prevent belt unwinding reel rotation in a manner that restrains a belted vehicle occupant during such deceleration, and the nose portion of the receptacle draining the mercury back to the sump portion thereof subsequent to the cessation of the vehicle deceleration so that the mercury thus moves rearward of the axis of locking member movement and thereby pivotally moves the locking member back to unlocked position.

4. A vehicle occupant restraint belt retractor comprising:
   a housing adapted to be mounted on a vehicle and including a fixed locking portion;
   a belt reel rotatably supported on the housing for movement in belt winding and unwinding directions of rotation while in spaced relationship to the fixed locking portion of the housing and being bodily movable toward said locking portion in a direction contained within a plane through the axis of reel rotation and generally through the locking portion, the reel including a drum for receiving an associated restraint belt and a pair of end plates at the ends of the drum, and the end plates defining circumferentially spaced locking surfaces facing in the belt unwinding direction of rotation;
   first spring means biasing the belt reel bodily away from the fixed locking portion of the housing;
   second spring means biasing the belt reel in the belt winding direction of rotation so as to store the belt on the reel in a wound condition;
   an elongated locking member mounted on the housing for pivotal movement about a generally transverse vehicle axis between an unlocked position in spaced relationship to the reel and a locked position in engagement with a selected pair of locking surfaces on the reel end plates to prevent belt unwinding reel rotation, belt tension applied to the reel with the locking member in locked position bodily shifting the reel toward the fixed locking portion of the housing and engaging a selected pair of the locking surfaces on the end plates with this locking portion so that the locking member and locking portion cooperate in holding the reel against belt unwinding reel rotation; and
   a receptacle carried by each end of the locking member and having mercury received therein, each receptacle having a generally pistol-shaped configuration pointing forwardly with respect to the vehicle and thereby defining a lower and rearward sump portion receiving the mercury so as to position the locking member in the unlocked position and also defining a forward nose portion to which the mercury moves in response to a predetermined deceleration of the rate of forward vehicle movement so that the mercury moves from the rearward side of the axis of locking member movement to the forward side thereof in a manner that pivots the locking member to locked position and thereby cooperates with the fixed locking portion of the housing to hold the belt reel against belt unwinding rotation, and the nose portion of each receptacle draining the mercury back to the sump portion thereof subsequent to the cessation of the vehicle deceleration so that the mercury moves rearward of the axis of locking member movement and thereby pivotally moves the locking member back to unlocked position after the first spring means first moves the reel bodily away from and out of engagement with the fixed locking portion of the housing.

* * * * *